United States Patent [19]
Sakaue et al.

[11] Patent Number: 5,680,727
[45] Date of Patent: Oct. 28, 1997

[54] AUTOMATIC PLANTING APPARATUS

[75] Inventors: Toyokazu Sakaue, Kaizuka; Yoshimi Abe; Shinji Murai, both of Jushiyama, all of Japan

[73] Assignee: M-Hydroponics Research Co., Ltd., Aichi, Japan

[21] Appl. No.: 448,497

[22] PCT Filed: Sep. 30, 1994

[86] PCT No.: PCT/JP94/01648

§ 371 Date: Jun. 13, 1995

§ 102(e) Date: Jun. 13, 1995

[87] PCT Pub. No.: WO95/09525

PCT Pub. Date: Apr. 13, 1995

[30] Foreign Application Priority Data

Oct. 1, 1993 [JP] Japan .................................. 5-271285

[51] Int. Cl.$^6$ ............................ A01G 31/02; A01C 11/02
[52] U.S. Cl. .................................................. 47/1.01
[58] Field of Search ........................... 47/1.01, 1 M

[56] References Cited

U.S. PATENT DOCUMENTS

| | | | |
|---|---|---|---|
| 5,445,089 | 8/1995 | Houng et al. | 47/1.01 |
| 5,488,802 | 2/1996 | Williames | 47/1.01 |
| 5,557,881 | 9/1996 | Bouldin et al. | 47/1.01 |
| 5,573,558 | 11/1996 | Huang | 47/1.01 |

*Primary Examiner*—Terry Lee Melius
*Assistant Examiner*—Joanne C. Downs
*Attorney, Agent, or Firm*—Donald S. Dowden

[57] ABSTRACT

In an automatic planting apparatus (10) a first predetermined number of pieces of blocks (4) in the first row of a plant supporting sheet (3) on a sub-conveyer (13) are torn off by a block separator (25). The blocks (4) that are torn off are inserted into holes (2) in the first row of a panel (1) on a main conveyer (11) by a block inserting unit (39). The panel (1) is then fed forward by a row pitch by a main feeder (15) and slid laterally with the sub-conveyer (13) by a distance corresponding to the width of each block (4) by a sliding unit (17). The block inserting operation is then repeated.

4 Claims, 8 Drawing Sheets

AUTOMATIC PLANTING APPARATUS

FIELD OF THE INVENTION

The present invention relates to an apparatus to insert automatically plant supporting blocks into holes of a panel used in hydroponics.

DESCRIPTION OF THE PRIOR ART

As shown in FIG. 10, in a panel (1) used in hydroponics, a large number of holes (2) are arranged lengthwise and sideways, and, on the other hand, a plant supporting sheet (3) is divided into a plural number of blocks (4) by cutting lines (5) arranged intermittently lengthwise and sideways and a plant P is supported in each block (4). Said panel (1) is mainly made of a polystyrene foam and said plant supporting sheet (3) is mainly made of a soft type polyurethane foam.

Hitherto, said blocks (4) have been inserted into holes (2) of said panel (1), by manually tearing off said blocks (4) from said plant supporting sheet (3) by worker's hand. Nevertheless, many workers and heavy labor have been necessary to tear off said blocks (4) from said plant supporting sheet (3) and insert respectively said blocks (4) into holes (2) of said panel (1) by hand.

DISCLOSURE OF THE INVENTION

As a means to solve the above described problem in the prior art, the present invention provides an automatic planting apparatus (10) consisting of a main conveyer (11) to convey a panel (1) in which holes (2) are arranged along l number (a first predetermined number) of lines and a plural number of rows, a sub-conveyer (13) to convey a plant supporting sheet (3) divided into blocks (4) along m number (a second predetermined number) of lines and a plural number of rows by cutting lines and arranged above or below said main conveyer (11) so as to slide right and left, a block separator (25) arranged near the front side of said sub-conveyer (13) for tearing off l pieces of blocks (4) in the same row from said plant supporting sheet (3), and a block inserting unit (39) inserting l pieces of blocks (4) torn off by said block separator (25) into l number of holes (2) in the same row respectively, wherein said main conveyer (11) has a main feeder (15) to feed said panel (1) forward by a pitch between rows when all blocks (4) have been inserted into l number of holes (2) in a row, and said sub-conveyer (13) has a sliding unit (17) to slide said plant supporting sheet (3) sideways by a distance corresponding to the width of each block (4) when all blocks (4) have been inserted into holes (2) arranged in a row of said panel (1) and a sub-feeder (16) feeding said plant supporting sheet (3) forward by a distance corresponding to the length of each block (4) when all blocks (4) in the front row have been torn off, and m is an integral multiple of l.

To insert said blocks (4) into holes (2) of panel (1), l pieces of blocks (4) in the first row are torn off at an interval of n -1 pieces of blocks (4) from said plant supporting sheet (3) on said sub-conveyer (13) of said automatic planting apparatus (10). The quantity n is the number of repetitions of a movement as explained below. Then said l pieces of blocks (4) are inserted into l number of holes (2) in the first row of said panel (1) on said main conveyer (11) by said block inserting unit (39). After that, said panel (1) is fed forward by a pitch between rows by said main feeder (15) and said plant supporting sheet (3) on said sub-conveyer (13) is slided sideways by a distance corresponding to the width of each block (4) by said sliding unit (17) and the above described movement to insert said blocks (4) into holes (2) of said panel (1) is repeatedly carried out. When said movement is repeated n times, all blocks (4) in the first row of said plant supporting sheet (3) have been torn off and then said plant supporting sheet (3) is fed forward by a distance corresponding to the length of each block (4).

As above described, said plant supporting blocks (4) are inserted into said holes (2) of said panel (1) successively.

Accordingly, in the present invention, the number of workers and time to insert the plant supporting blocks into the hales of the panel used in hydroponics are greatly reduced.

BRIEF DESCRIPTION OF THE DRAWINGS

FIG. 1 is a partial side view.

FIG. 2 is a partial plan.

FIG. 3 is a diagram showing the attaching of the sliding frame.

FIG. 4 is a diagram showing the panel extractor.

FIG. 5 is a diagram showing the process of separating the block.

FIG. 6 is a diagram showing the process of holding the block.

FIG. 7 is a diagram showing the process of planting the block.

FIG. 8 is a diagram showing the planting of the first row on the panel.

FIG. 9 is a diagram showing the planting of the second row on the panel.

DETAIL DESCRIPTION OF THE INVENTION

Figure 1:
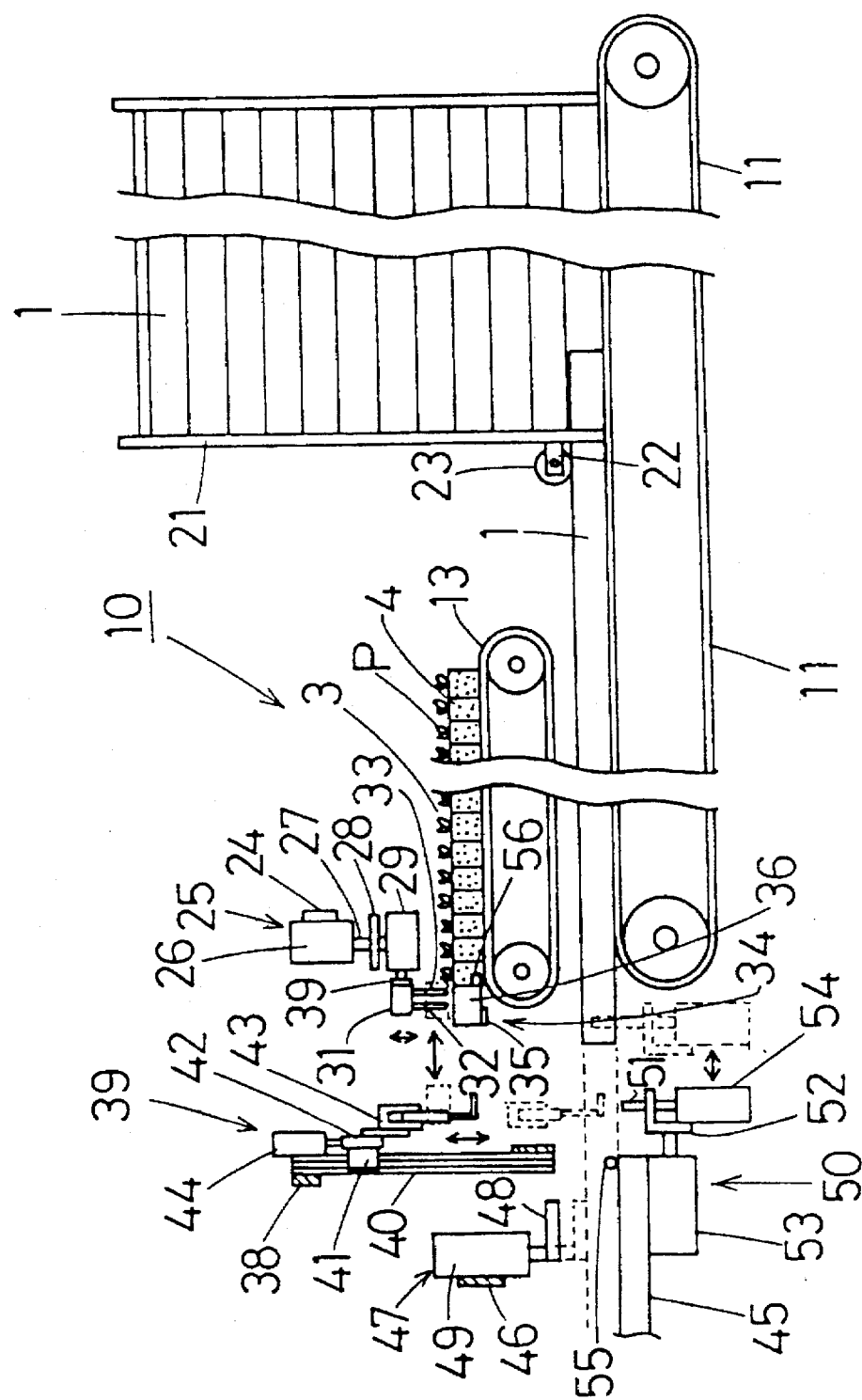
FIGS. 1 to 9 show an embodiment of the present invention.
Figure 2:
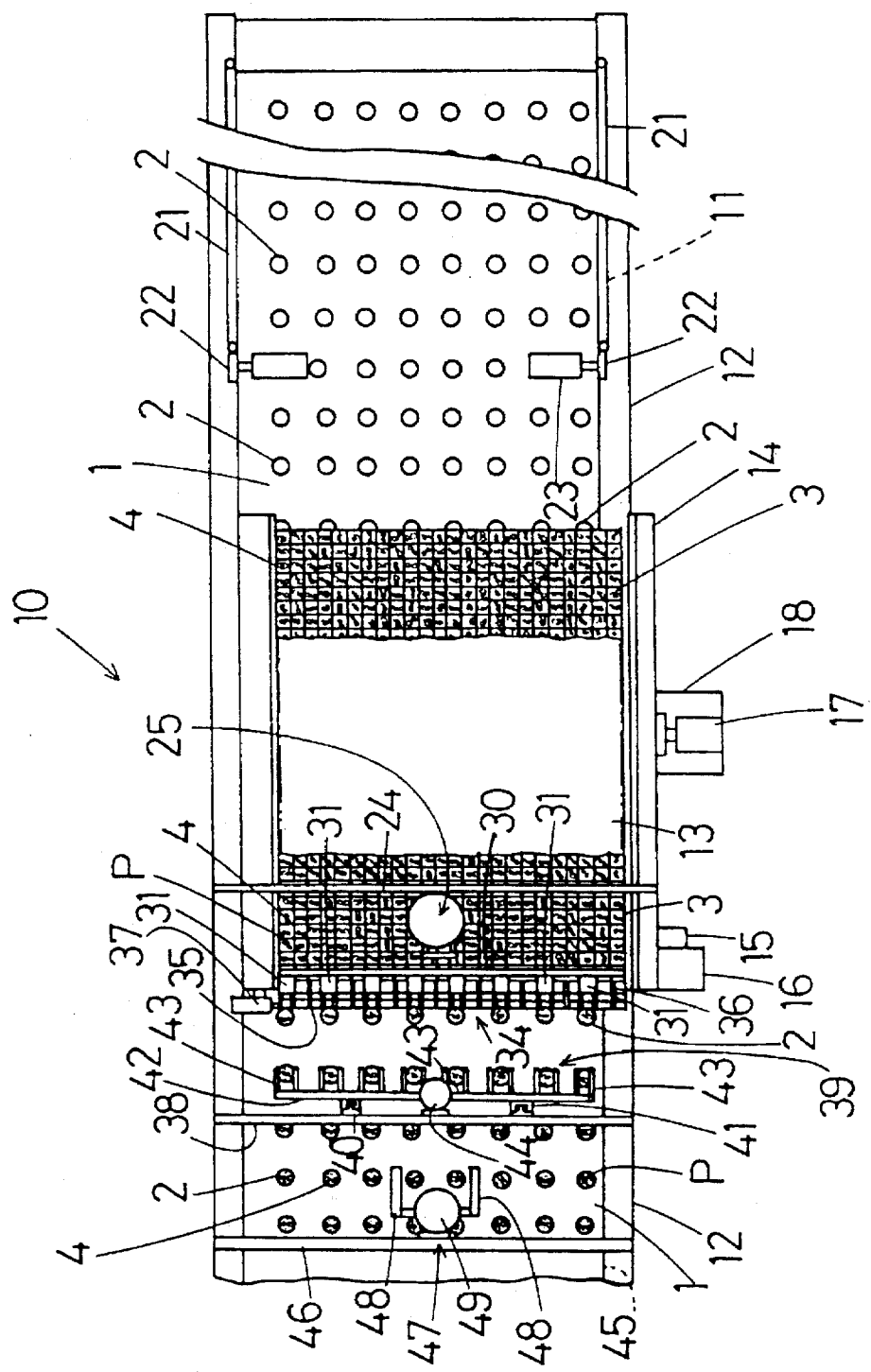

FIG. 1 to FIG. 9 relate to an embodiment of the present invention. In an automatic plant apparatus (10) shown in the Figures, a main conveyer (11) to convey a panel (1) is supported in a main frame (12) and a sub-conveyer (13) to convey a plant supporting sheet (3) is arranged above said main conveyer (11) wherein said sub-conveyer (13) is supported in a sliding frame (14) arranged on said main frame (12) so as to slide right and left.

Figure 3:
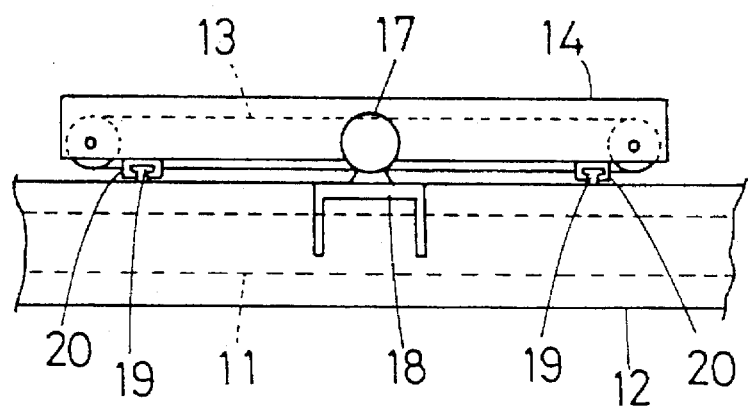

Said main conveyer (11) is driven by a motor (15) as a main driving unit and said sub-conveyer (13) is driven by a motor (16) as a sub-driving unit. Further, said sliding frame (14) is slid right and left by an air cylinder (17) as a sliding unit supported by a bracket (18) extending from the side of said main frame (12) and as shown in FIG. 3, the slide of said sliding frame (14) is guided by a pair of rails (19) wherein grips (20) attached on the bottom of said sliding frame (14) grip said rails (19) to slide freely.

At the rear end of said main conveyer (11), a panel frame (21) to carry and support said panels (1) stands from said main frame (12) and a pair of guide rollers (23) are arranged at the right and left sides of the front end of said panel frame (21) and the space between said guide roller (23) and said main conveyer (11) is substantially equal to the thickness of said panel (1).

At the front end of said sub-conveyer (13), a block separator (25) supported by a supporting frame (24) extending from said main frame (12) is arranged above said sub-conveyer (13). Said block separator (25) comprises an air cylinder (26) to move upward and downward, an air cylinder (29) to move forward and backward wherein said air cylinder (29) is supported by a base (28) attached at the end of a piston (27) of said air cylinder (26) , 8 pieces of bases (31) extending from a side panel (30) attached at the end of said air cylinder (29) and guide bars (32) and needles (33) extending downward from each base (31).

Further, a guide unit (34) is arranged at the end of said sub-conveyer (13), and said guide unit (34) consists of a vibration base (35), 25 pieces of guide panel (36) arranged on said vibration base (35) at regular intervals and an air cylinder vibrating said vibration base (35).

A block inserting unit (39) supported by a supporting frame (38) extending from a main frame (12) is arranged in front of said block separator (25). Said block inserting unit (39) comprises a side frame (42) supported by a pair of guide rails (40) intermediating grips (41) and movable along said guide rails (40), 8 pieces of air grips (43) arranged on said side frame (42) and an air cylinder (44) to move said side frame (42) upward and downward.

A receiving table (45) is supported on said main frame (12) in front of said main conveyer (11) and a holder (47) supported by a supporting frame (46) extending from said main frame (12) is arranged on the receiving table (45). Said holder (47) consists of a holding fork (48) and an air cylinder (49) to move said holding fork (48) upward and downward.

A panel extractor (50) is arranged below the rear end of said receiving table (45). Said panel extractor (50) consists of a frame (52) equipped with a pair of inserting bars (51) movable upward and downward to take in and out from holes (2) of said panel (1), an air cylinder (53) to move said frame (52) forward and backward, and an air cylinder (54) to move said inserting bar (51) upward and downward.

Movement to insert said plant supporting blocks (4) into holes (2) of said panel (1) by using said automatic planting apparatus (10) is explained as follows:

Said panel (1) is made of material such as a polystyrene foam, and said holes (2) of said panel (1) are arranged along 8 lines wherein said lines are arranged at regular intervals and a plural number of holes (2) are arranged along each line at regular intervals. The plant supporting sheet (3) is made of a material such as a soft type polyurethane foam and said plant supporting sheet (3) is divided by cutting lines (5) arranged intermittently lengthwise and sideways into blocks (4) which are arranged along 24 lines and a plural number of rows. A plant P is supported in each block (4), and the interval of lines of holes (2) of said panel (1) is fixed to be equal to the width of two pieces of blocks (4). Generally speaking, holes (2) of said panel (1) are arranged along l number of lines and a plural number of rows, blocks (4) of said plant supporting sheet (3) are arranged along m number of lines and a plural number of rows, and m is n times l wherein n is an integral number, and the interval of lines of holes (2) is fixed to be equal to the width of n -1 pieces of blocks (4). In this embodiment, l=8, m=24 and n=3.

Figure 4:
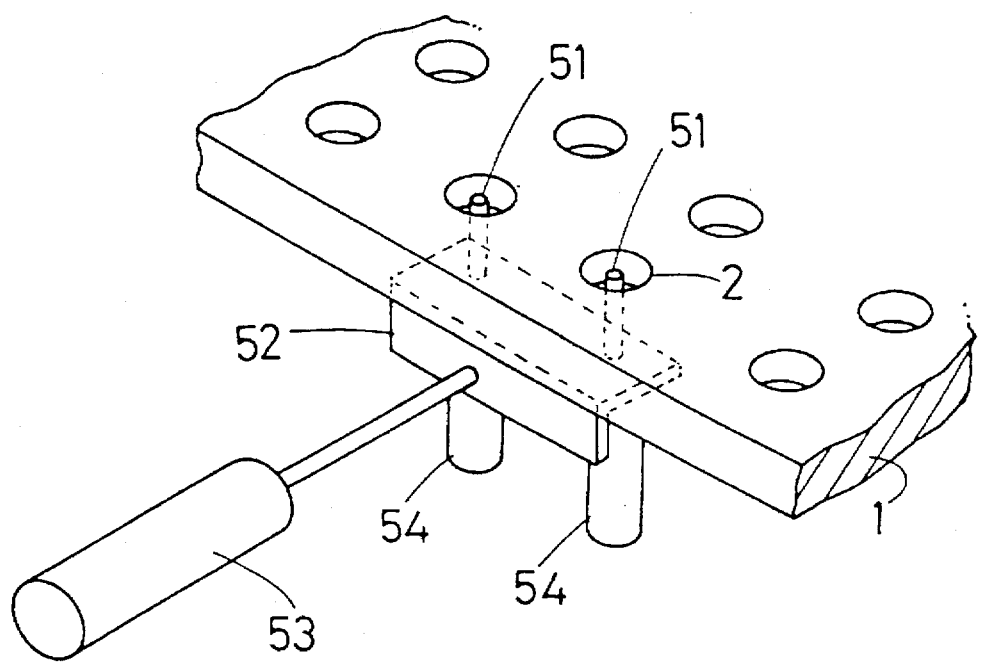
Figure 5:
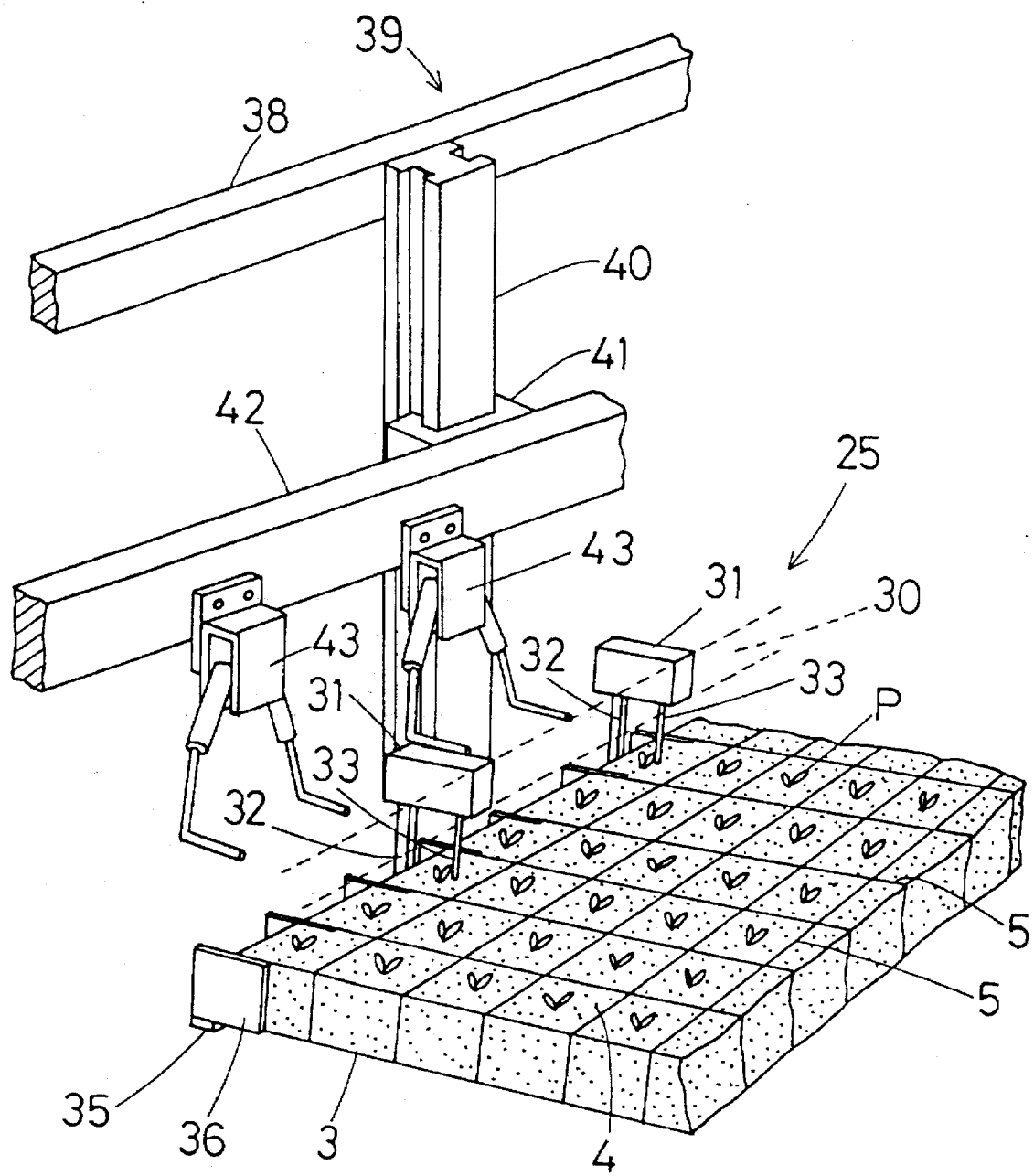

A plural number of said panels (1) are piled in said panel frame (21) and a panel (1) in the lowest position is conveyed forward one by one by said main conveyer (11) through said guide roller (23) and said plant supporting sheet (3) is conveyed forward by said sub-conveyer (13). In this case, said guide panel (36) of said guide unit (34) is vibrated by an air cylinder (37) intermediating said vibration base (35). And when holes (2) of said panel (1) in the first row have reached an inserting position, blocks (4) of said plant supporting sheet (3) along the first row have reached a separating position. In this case, the frame (52) is pushed backward by the air cylinder (53) of said panel extractor (50) and the inserting bars (51) are put into predetermined holes (2) in the first row by the air cylinder (54) and then said frame (52) is extracted forward by the air cylinder (53) to set holes (2) of said panel (1) along the first row correctly at the inserting position as shown in FIG. 4. Further, the guide panels (36) of said guide unit (34) are respectively inserted into cutting lines (5) of said plant supporting sheet (3) from the front end of said plant supporting sheet (3) as shown in FIG. 5. In the situation above described, both of photoelectric switches (55, 56) are respectively set to ON to stop said main conveyer (11) and said sub-conveyer (13) respectively, and the base (28) moves downward by the air cylinder (26) of said block separator (25) to stick the needles (33) of the base (28) into the center of blocks (4) situated every 3 pieces attaching the guide bars (32) to the front face of said blocks (4) respectively, and at the same time, said extractor (50) is returned to the prior position by the air cylinders (53, 54).

Figure 6:
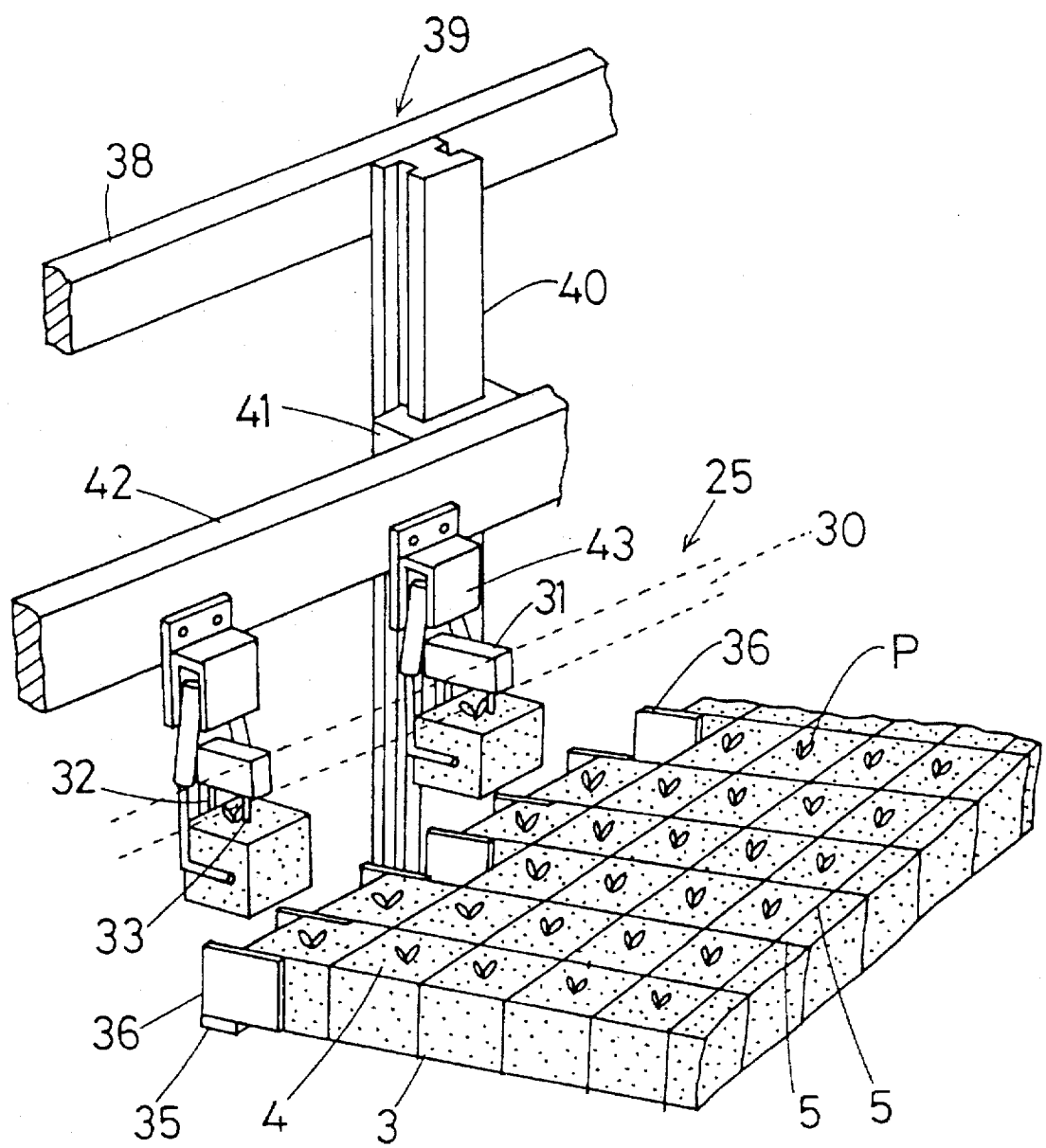

Following said operation of the air cylinder (26) of said block separator (25), the base (28) is pushed forward to the inserting position by the air cylinder (29) to tear off 8 pieces of blocks (4) situated every 3 pieces in the first row of said plant supporting sheet (3) and said blocks (4) are set at the inserting position by the needles (33) and the guide bars (32) holding said blocks (4) according to the movement of the base (28) above described. At the same time, said blocks (4) are respectively gripped by the air grips (43) of said block inserting unit (39) on both sides as shown in FIG. 6.

Figure 7:
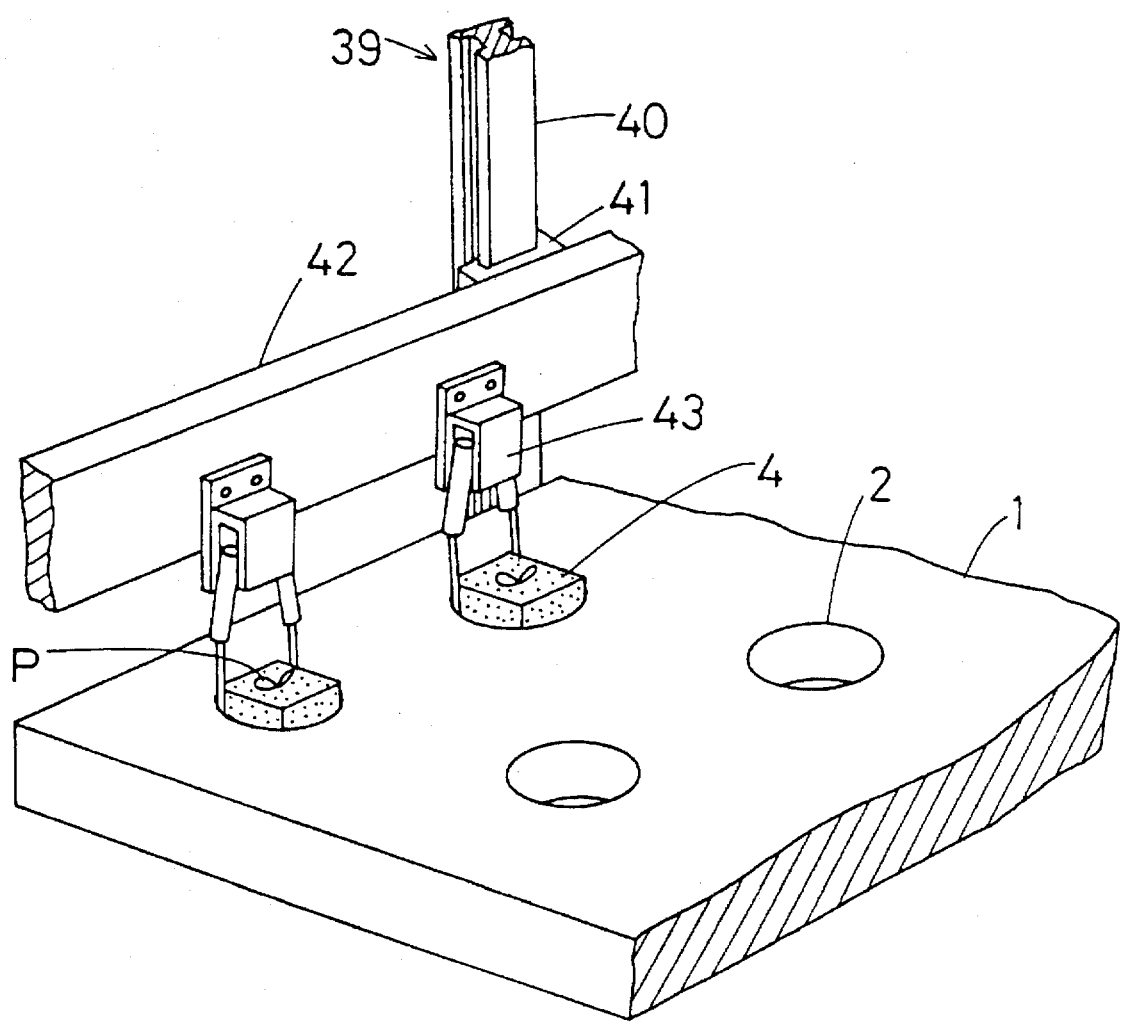

When 8 pieces of said blocks (4) are respectively gripped by the air grips (43) of said block inserting unit (39), then the side frame (42) supporting said air grips (43) moves downward by the air cylinder (44) to insert each block (4) into each hole (2) of said panel (1) as shown in FIG. 7, and at the same time, the base (31) is returned to the prior position by the air cylinders (26, 29) of said block separator (25).

Figure 8:
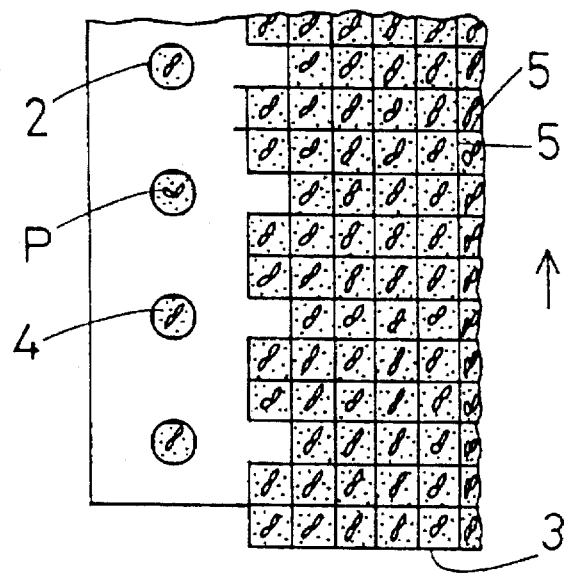
Figure 9:
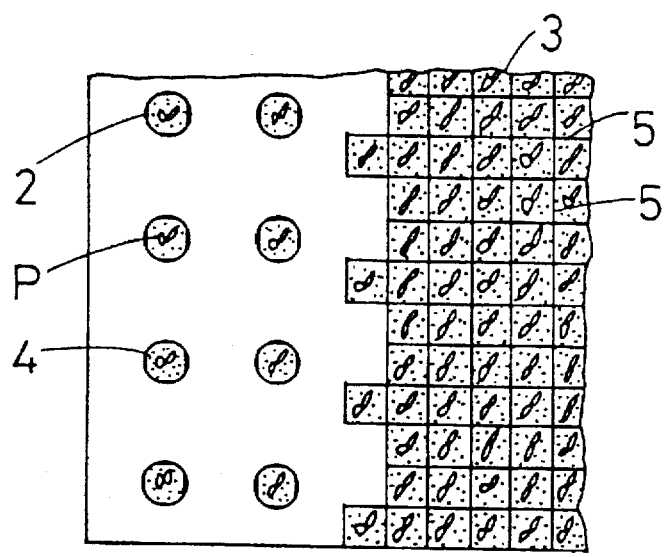
Figure 10:
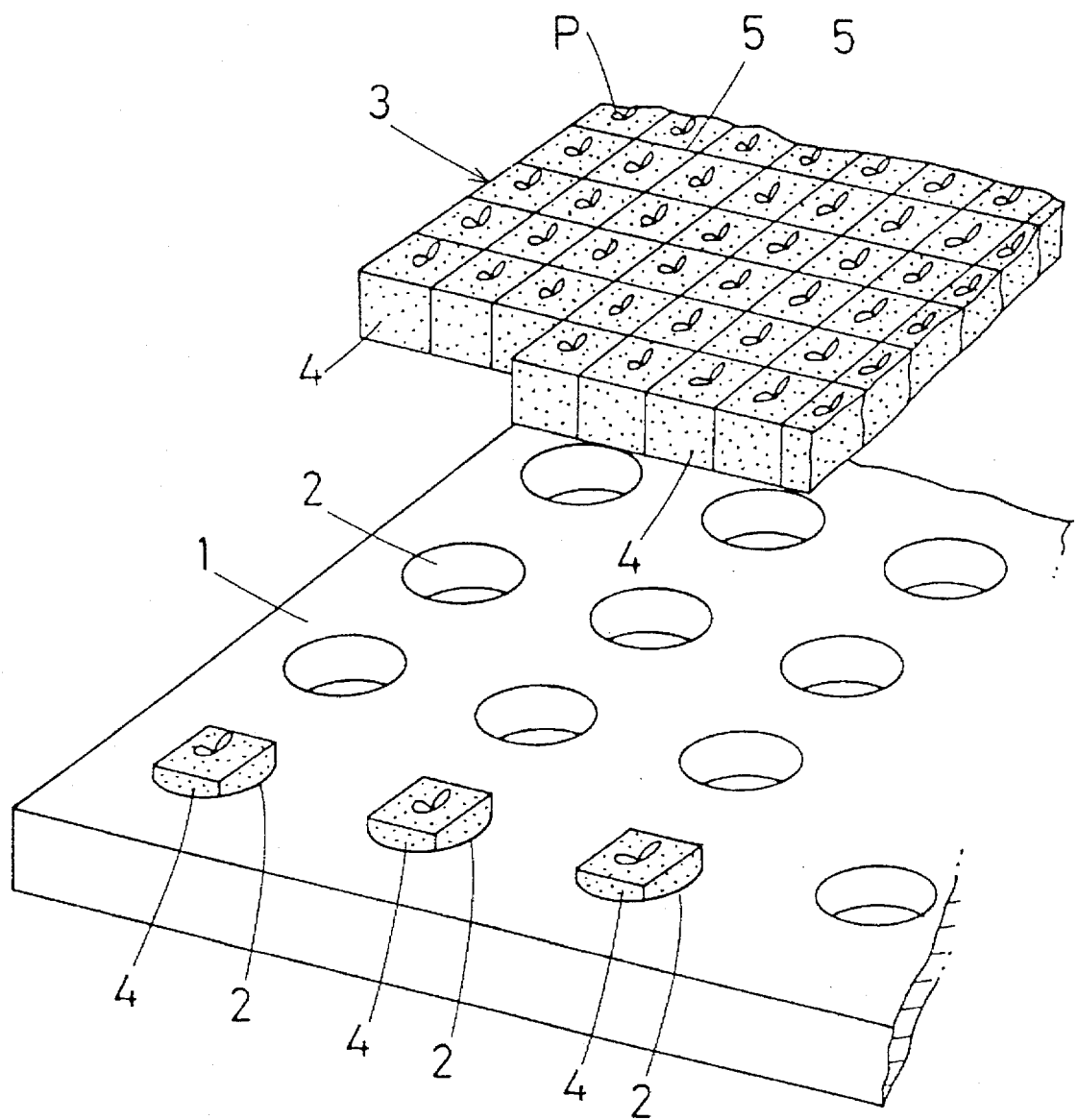
FIG. 10 is a diagram of the prior art.

As above described, 8 pieces of blocks (4) have been inserted into predetermined holes (2) in the first row of said panel (1), and then said blocks (4) are respectively released from the air grips (43) to move said air grips (43) upward to return to the prior position with the side frame (42) by the air cylinder (44). After 8 pieces of blocks (4) have been inserted into predetermined holes (2) as shown in FIG. 8, said sliding frame (14) of said sub-conveyer (13) is pushed by the air cylinder (17) to slide by a distance corresponding to the width of each block (4) in the direction shown by an arrow in FIG. 8, and said panel (1) is fed forward by said main conveyer (11) and adjusted by said panel extractor (50) by a distance equal to the pitch between rows to set holes (2) in the second row of said panel (1) at the inserting position. After the setting above described, said block separator (25) and said block inserting unit (39) are again operated successively to tear off and insert the next 8 pieces of blocks (4) into the next eight holes (2) in the second row of said panel (1) as shown in FIG. 9.

As above described, when said blocks (4) have been respectively inserted into 8 holes (2) in the third row of said panel (1), all blocks (4) in the first row of said plant supporting sheet (3) are torn off and the photoelectric switch (56) is set to OFF to feed said plant supporting sheet (3) forward by a distance corresponding to the length of each block (4) by said sub-conveyer (13). In this situation, vibrating guide panels (36) of said guide unit (34) respectively go into the cutting lines (5) of said plant supporting sheet (3) from the front end of said plant supporting sheet (3) and the photoelectric switch (56) is set to ON to insert said blocks (4) successively into holes (2) from the fourth row of said panel (1) and said panels (1) supporting the plants P are successively receiving on said receive table (45). When each panel (1) is extracted by said panel extractor (50), the holder (47) is operated at the same time to hold said panel (1) by the holding fork (48) operated by the air cylinder (49) of said holder (47) while the inserting bars (51) of the panel extractor (50) are respectively inserted into holes (2) of said panel (1).

In the present invention, the main conveyer may be arranged above the sub-conveyer and the blocks of the plant supporting sheet may be torn off by a grip type block separator, and further the block separator may be combined with the block inserting unit and in this case, the blocks torn off by the block separator may be inserted into holes of the panel by said block separator combined with the block inserting unit.

Further, as a driving source to operate said block separator and said block inserting unit, an electromagnetic cylinder, an oil pressure cylinder, a motor and the like may be used.

We claim:

1. An automatic planting apparatus comprising:

a main conveyer to convey a panel in which holes are arranged along a first predetermined number l of lines and a plural number of rows;

a sub-conveyer to convey a plant supporting sheet divided into blocks along a second predetermined number m of lines and a plural number of rows by cutting lines, said sub-conveyer having a front side and being arranged above or below said main conveyer so as to slide right and left;

a block separator arranged near the front side of said sub-conveyer, said block separator being adapted for tearing off l number of blocks in a same row from said plant supporting sheet; and a block inserting unit for inserting l number of blocks torn off by said block separator into l number of holes in the panel in a same row of the panel respectively, wherein:

said main conveyer comprises a main feeder to feed said panel forward by a pitch between rows of the panel when all blocks have been inserted into l number of holes in a row of the panel;

said sub-conveyer comprises a sliding unit to slide said plant supporting sheet sideways by a distance corresponding to the width of each block when all blocks have been inserted into holes arranged in a row of said panel and a sub-feeder for feeding said plant supporting sheet forward by a distance corresponding to the length of each block when all blocks in a front row of the plant supporting sheet have been torn off; and m is an integral multiple of l.

2. An automatic planting apparatus in accordance with claim 1 wherein m is three times l.

3. An automatic planting apparatus in accordance with claim 1 wherein said plant supporting sheet is a soft type polyurethane foam sheet.

4. An automatic planting apparatus in accordance with claim 1 wherein said panel is a polystyrene foam panel.

* * * * *